No. 843,958. PATENTED FEB. 12, 1907.
T. F. MOORE.
KEY RING TAG.
APPLICATION FILED NOV. 20, 1905.
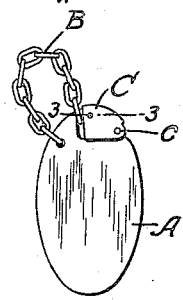
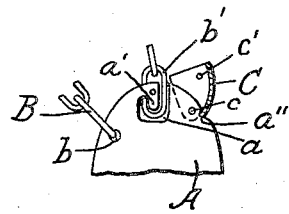
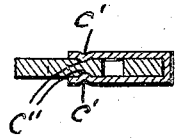
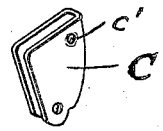
WITNESSES:
B. E. Robinson
G. C. Lincoln
INVENTOR:
T. F. Moore
BY:
Howard P. Denison
ATTORNEY.
THE NORRIS PETERS CO., WASHINGTON, D. C.

UNITED STATES PATENT OFFICE.

THOMAS F. MOORE, OF NEWARK, NEW JERSEY, ASSIGNOR TO THE WHITEHEAD & HOAG COMPANY, OF NEWARK, NEW JERSEY, A CORPORATION OF NEW JERSEY.

KEY-RING TAG.

No. 843,958.     Specification of Letters Patent.     Patented Feb. 12, 1907.

Application filed November 20, 1905. Serial No. 288,218.

*To all whom it may concern:*

Be it known that I, THOMAS F. MOORE, of Newark, in the county of Essex, in the State of New Jersey, have invented new and useful Improvements in Key-Ring Tags, of which the following, taken in connection with the accompanying drawings, is a full, clear, and exact description.

This invention relates to improvements in key-ring tags, having a flexible chain or cord permanently attached at one end to the tag and having its opposite end detachably interlocked with said tag, whereby one end of the chain may be freed to permit the keys to be strung upon or removed therefrom.

My object, therefore, is not only to provide a flexible key-ring, but also to supply the key-ring with a comparatively-thin light sheet-metal tag or plate having a suitable locking device for the detachable end of the chain, adapted to receive the name of the owner or other desired inscription.

In the drawings, Figure 1 is a face view of my improved key-ring tag, the locking member and key-ring being shown in operative position. Fig. 2 is an enlarged face view of the upper portion of the tag and adjacent ends of the key-ring, showing the locking member in its open position and the adjacent end of the key-ring as about to be detached or reinserted. Fig. 3 is an enlarged sectional view taken on line 3 3, Fig. 1; and Fig. 4 is a perspective view of the detached locking member.

A represents a thin flat sheet-metal tag, which in this instance is oval in outline and is provided with an angular slot $a$, extending inwardly and laterally at one end for forming a hook-shaped shoulder $a'$. A flexible ring, as a chain B, has one end passed through a suitable aperture $b$ in the tag A for permanent securement to said tag, the other end of said ring or chain being provided with a link $b'$, adapted to be inserted into the slot $a$ for interlocking engagement with the hook $a'$. A swinging clasp or locking member C is pivoted at $c$ to a tag A at one side of the opening $a$ opposite to that upon which the hook $a'$ is formed and is preferably made U-shaped in cross-section, thus forming a hood of sufficient radial length to cover the open end of the slot $a$ when it is closed, as seen in Fig. 1, thereby preventing accidental detachment of the adjacent end of the chain-ring B from the hook $a'$.

The sides of the hood or locking member C lap upon the opposite sides of the adjacent end of the tag A a sufficient distance to cover the greater portion of the slot $a$ and hook $a'$, leaving just sufficient space for the free flexing movement of the link $b'$ when interlocked with the hook.

The end of the outer wall of the hood or locking member C near the pivot $c$ serves as an abutment for engaging a notch or shoulder $a''$ in the adjacent edge of the tag A to limit the opening movement of the locking member C when the latter is swung clear of the open end of the slot $a$, as seen in Fig. 2. This outer wall or side of the locking-hood C is preferably curved to closely fit upon the adjacent curved edge of the tag A, said locking member C being formed of comparatively thin sheet metal, so that its sides may lie closely to the opposite faces of said tag. The free end of this locking member C is disposed in a plane at substantially right angles to the adjacent end of its outer curved wall and when closed, as seen in Fig. 1, is substantially parallel to and coincident with the long axis of the tag A and forms an abutment between the links $b'$ and pivot $c$ to better resist accidental unlocking of the member C.

As a further protection against accidental opening of this locking member C, I provide its opposite sides with inward depressions $c'$, as best seen in Fig. 3, which depressions register and interlock with recesses $c''$ in the hook portion $a'$, so as to frictionally hold said locking member in its closed position. When it is desired to place one or more keys upon or remove them from the ring B, the locking member C is thrown to the position seen in Fig. 2 to permit the link $b'$ to be detached from the hook $a'$, and after the key or keys have been placed upon or removed from the free end of the chain B the link $b'$ is again inserted into the slot $a$ in engagement with the hook $a'$, and the locking member C is then restored to its normal locked position, as previously described.

What I claim is—

1. A key-ring tag comprising a disk having an angular slot open at one end through the edge of the disk forming a hook at one side of the open end of the slot, a U-shaped clasp pivoted to the disk at the opposite side of the slot and having its opposite sides movable to and from a position across the slot and hook, the hook and clasp being provided with frictional locking members and the outer portion of the clasp uniting the sides having a portion thereof extending across the open end of the slot when the clasp is closed.

2. In a key-ring tag of the class described, a disk having an angular slot open at one end through the periphery of the disk, a chain attached at one end of the disk and having one of its links removably inserted in said slot, and a U-shaped clasp pivoted to the disk and having its opposite side pieces and outer portion uniting the side pieces movable to and from a position across the slot, and means on the clasp for frictionally locking it in its closed position.

In witness whereof I have hereunto set my hand on this 16th day of November, 1905.

THOMAS F. MOORE.

Witnesses:
  JAMES C. DAY,
  WILLIAM AINSLIE.